(12) United States Patent
Hahm et al.

(10) Patent No.: US 7,782,419 B2
(45) Date of Patent: Aug. 24, 2010

(54) BACKLIGHT UNIT AND LIQUID CRYSTAL DISPLAY DEVICE HAVING THE SAME

(75) Inventors: Hun Joo Hahm, Gyeonggi-do (KR); Hyung Suk Kim, Gyeonggi-do (KR); Dae Yeon Kim, Gyeonggi-do (KR)

(73) Assignee: Samsung LED Co., Ltd., Gyunggi-Do (KR)

( * ) Notice: Subject to any disclaimer, the term of this patent is extended or adjusted under 35 U.S.C. 154(b) by 305 days.

(21) Appl. No.: 12/073,386

(22) Filed: Mar. 5, 2008

(65) Prior Publication Data
US 2009/0135332 A1 May 28, 2009

(30) Foreign Application Priority Data
Nov. 23, 2007 (KR) ...................... 10-2007-0120189

(51) Int. Cl.
*G02F 1/1335* (2006.01)
*G02F 1/1333* (2006.01)
*G02F 1/136* (2006.01)
(52) U.S. Cl. ............................... 349/61; 349/58; 349/44
(58) Field of Classification Search .................. 349/61, 349/58, 44
See application file for complete search history.

(56) References Cited
U.S. PATENT DOCUMENTS

| | | | |
|---|---|---|---|
| 6,717,559 B2* | 4/2004 | Weindorf | 345/82 |
| 7,270,464 B2* | 9/2007 | Nakayoshi et al. | 362/613 |
| 7,425,729 B2* | 9/2008 | Yun et al. | 257/98 |
| 7,436,000 B2* | 10/2008 | Kim et al. | 257/98 |
| 7,438,437 B1* | 10/2008 | Chang | 362/248 |
| 7,572,036 B2* | 8/2009 | Yoon et al. | 362/331 |

FOREIGN PATENT DOCUMENTS

| | | |
|---|---|---|
| JP | 2007-219075 | 8/2007 |
| JP | 2008-251245 | 10/2008 |
| KR | 10-2007-0084641 | 8/2007 |

OTHER PUBLICATIONS

Japanese Office Action, w/ English translation thereof, issued in Japanese Patent Application No. JP 2008-050756 dated May 18, 2010.

* cited by examiner

*Primary Examiner*—Mike Qi
(74) *Attorney, Agent, or Firm*—McDermott Will & Emery LLP

(57) ABSTRACT

Provided is a backlight unit of an LCD device including a printed circuit board; a plurality of light emitting diodes (LEDs) mounted on the printed circuit board; and a bottom chassis formed with only an outer frame and having the printed circuit board housed thereon.

17 Claims, 4 Drawing Sheets

[FIG. 1A]
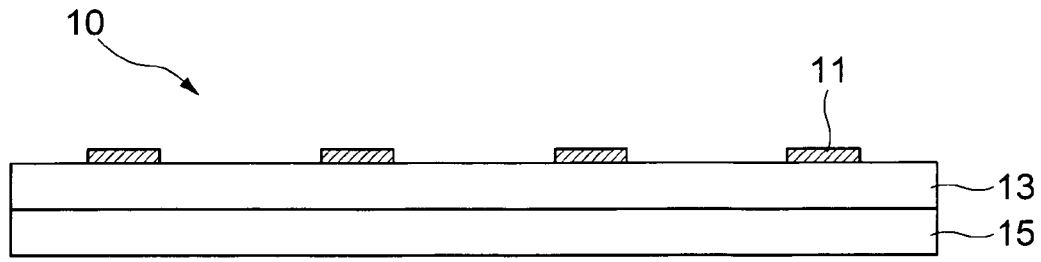
[FIG. 1B]
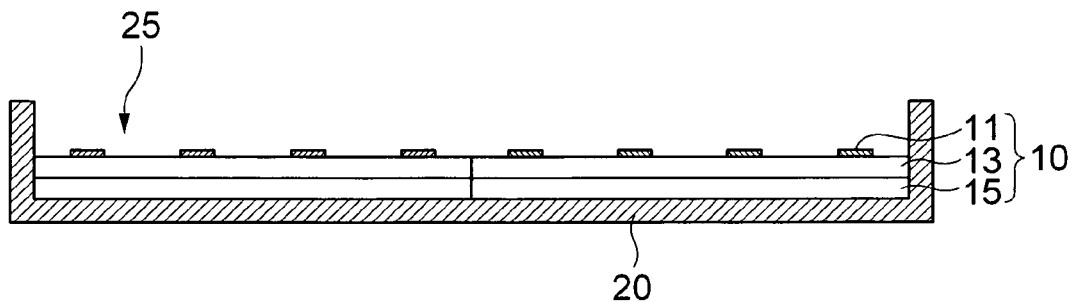

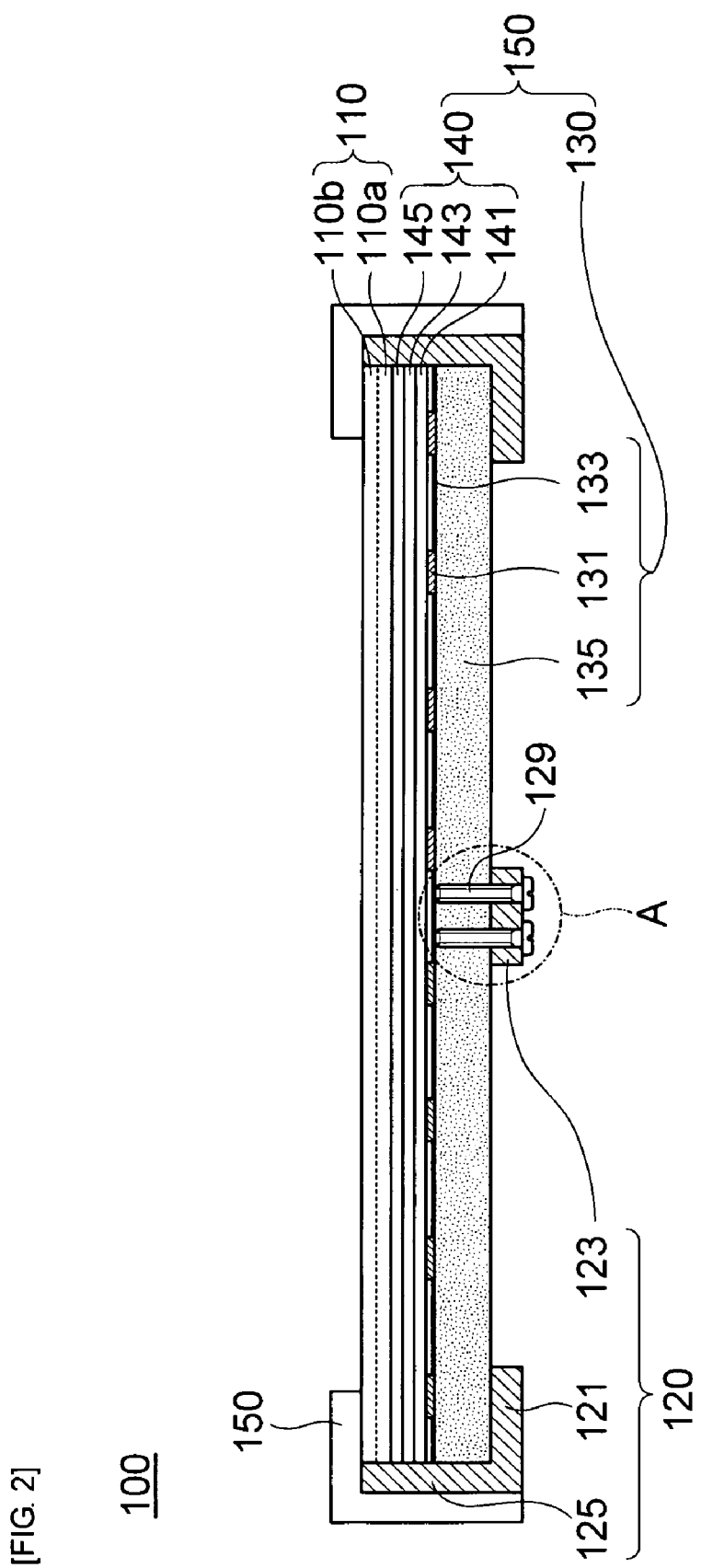

[FIG. 3]
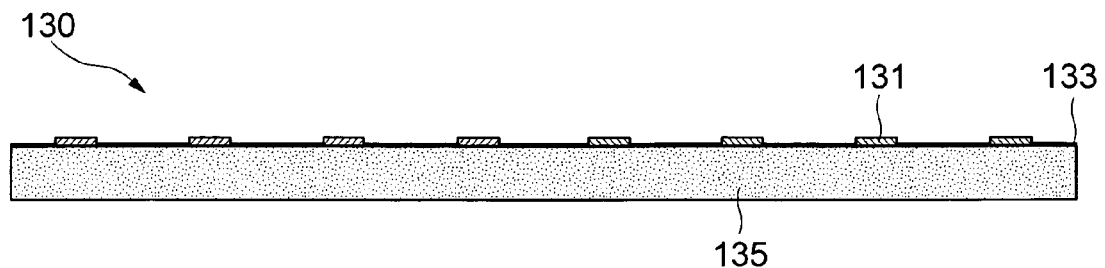
[FIG. 4]
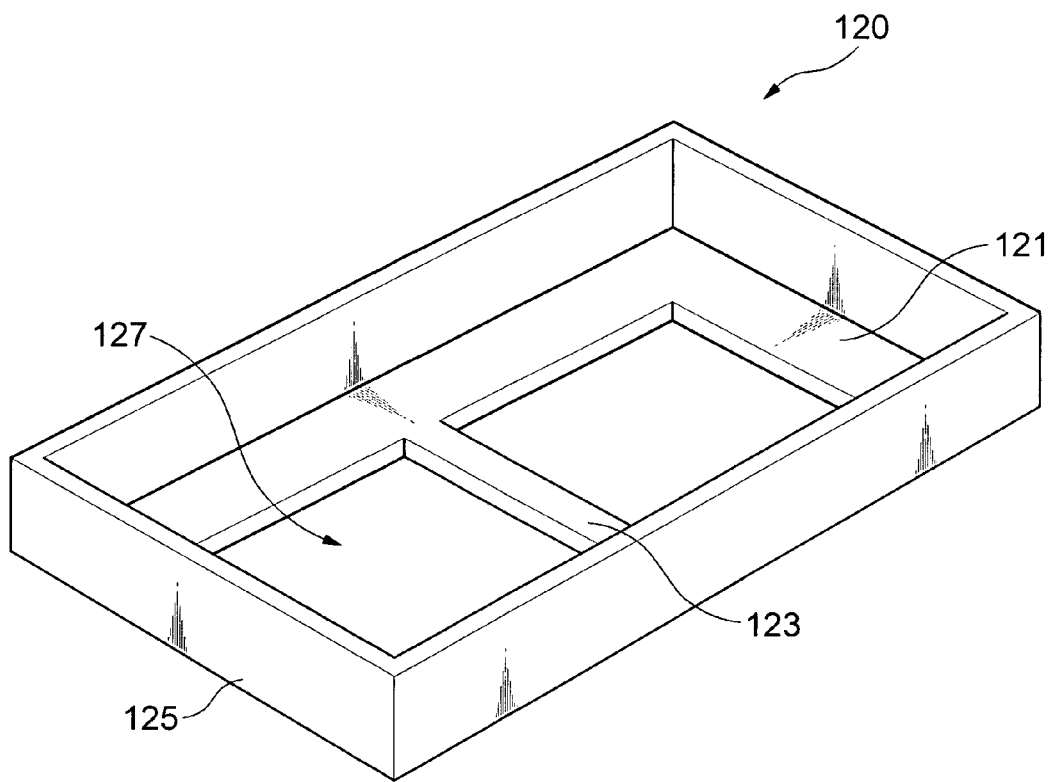

[FIG. 5]
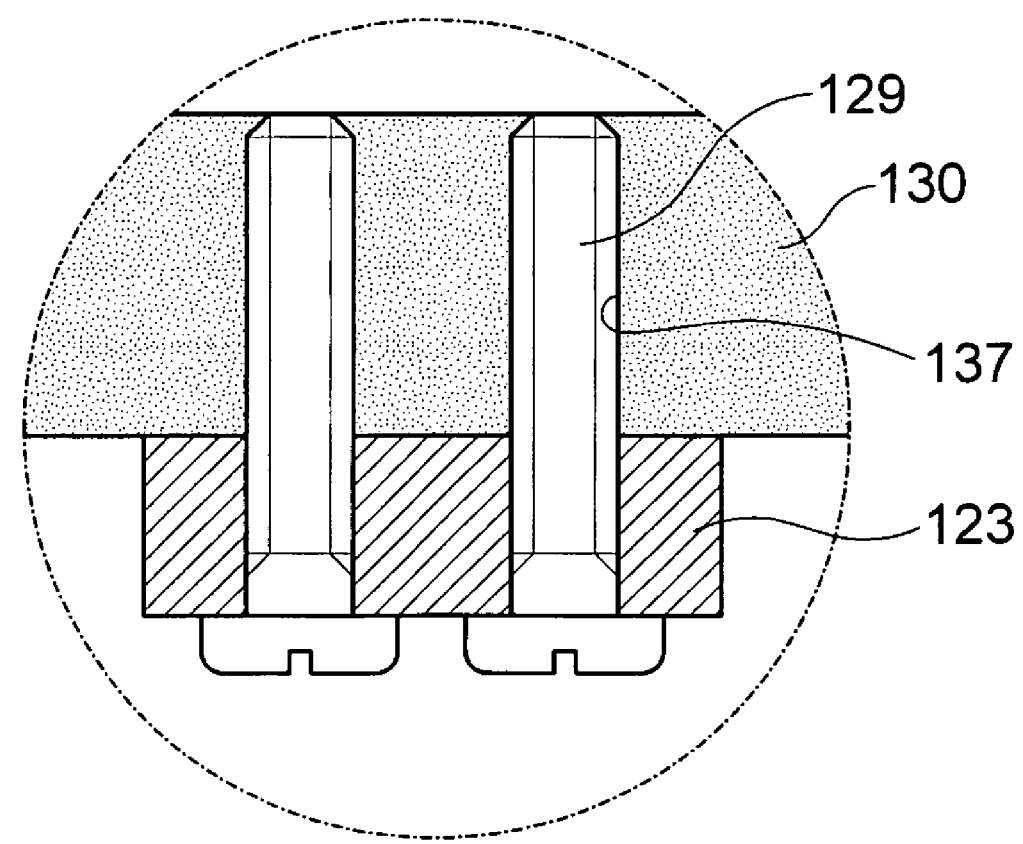

BACKLIGHT UNIT AND LIQUID CRYSTAL DISPLAY DEVICE HAVING THE SAME

CROSS-REFERENCE TO RELATED APPLICATIONS

This application claims the benefit of Korean Patent Application No. 10-2007-0120189 filed with the Korea Intellectual Property Office on Nov. 23, 2007, the disclosure of which is incorporated herein by reference.

BACKGROUND OF THE INVENTION

1. Field of the Invention

The present invention relates to a backlight unit and a liquid crystal display (LCD) device having the same.

2. Description of the Related Art

Recently, as the semiconductor technology rapidly develops, demand for flat display devices of which the performance is further enhanced is explosively increasing.

Among the flat display devices, an LCD device recently attracts public attention. Since the LCD device has an advantage in that reduction in size and weight and low power consumption can be achieved, the LCD device has been considered as a substitute which can overcome the disadvantages of an existing cathode ray tube (CRT). Currently, the LCD is mounted on most of information processing equipments which require a display device.

A general LCD device applies a voltage to a specific molecular arrangement of liquid crystal such that the molecular arrangement is converted into a different molecular arrangement. Further, changes in optical properties of liquid crystal cells, such as birefringence, optical rotatory power, dichroism, and light scattering characteristic, are converted into visual changes. Then, the modulation of light caused by the liquid crystal cells is used to display information.

Since an LCD panel of the LCD device is a passive element which cannot emit light, the LCD panel has a backlight which provides light to the LCD panel from the lower portion of the LCD panel. Middle-sized or large-sized LCD devices such as monitors or TVs use a lamp as a backlight. The lamp not only consumes a large amount of power, but also generates heat, thereby having an adverse effect upon element characteristics of the LCD panel. Further, since the lamp is typically formed in a rod shape, the lamp is vulnerable to impact. Further, temperature deviation in each portion of the lamp is so large that an image display quality is degraded.

Meanwhile, small-sized LCD devices of mobile products such as mobile phones use a light emitting diode (LED) as a backlight. Since the LED is a semiconductor element, the LED has a long lifespan and a high lighting speed. Further, the LED has low power consumption and high impact resistance, and the reduction in size and thickness can be achieved. When the LED having such advantages is applied to middle-sized and large-sized LCD devices, it is possible to solve the above-described problems of the lamp. That is, as the LED as a point light source is modified into a line light source or surface light source, the LED can be applied to middle-sized and large-sized LCD products.

FIGS. 1A and 1B are schematic views of an LED module used as a backlight of a conventional LCD device. FIG. 1A is a cross-sectional view of the LED module, and FIG. 1B is a cross-sectional view of a bottom chassis having the LED module mounted thereon.

As shown in FIGS. 1A and 1B, the LED module 10 used as a backlight of a conventional LCD device includes a printed circuit board 13 having a plurality of LEDs 21 mounted thereon and a heat transmission member 15 attached on the rear surface of the PCB 13.

The printed circuit board 13 has electrode patterns formed thereon, the electrode patterns supplying signals to the LEDs 21. The heat transmission member 15 radiates heat generated from the LEDs 21, thereby preventing degradation of the LEDs 21.

The LED module 10 constructed in such a manner is mounted in the bottom chassis 20 having a housing space provided therein. That is, the LEDs 21 are mounted on the printed circuit board 13, and the heat transmission member 15 is attached to the rear surface of the printed circuit board 13. Then, the heat transmission member 15 is mechanically attached to the bottom chassis 20.

Therefore, the heat transmission member 15 is housed so as to be interposed between the printed circuit board 13 and the bottom chassis 20.

In the LED module 10 housed in the bottom chassis 20, however, heat transmission is not smoothly performed because of an increase in resistance caused by heat resistance of the heat transmission member 15 and a defect in contact with the bottom chassis 20.

When the heat transmission is not smoothly performed, the temperature of the LED is increased, thereby degrading the brightness. Further, the lifespan of the LEDs is reduced.

SUMMARY OF THE INVENTION

An advantage of the present invention is that it provides a backlight unit and an LED device using the same, which has a bottom chassis formed with only an outer frame and has no heat transmission member, thereby enhancing a heat radiation effect.

Additional aspects and advantages of the present general inventive concept will be set forth in part in the description which follows and, in part, will be obvious from the description, or may be learned by practice of the general inventive concept.

According to an aspect of the invention, a backlight unit of an LCD device comprises a printed circuit board; a plurality of light emitting diodes (LEDs) mounted on the printed circuit board; and a bottom chassis formed with only an outer frame and having the printed circuit board housed thereon.

The printed circuit board and the bottom chassis may be formed of the same metallic material. For example, the printed circuit board and the bottom chassis may be formed of steel.

The backlight unit may further include an optical sheet provided on the LEDs. The optical sheet may include a diffusion sheet, a condensing sheet provided on the diffusion sheet, and a protective sheet provided on the condensing sheet.

The bottom chassis may include a first frame formed along the edge of the printed circuit board; at least one second frame which divides a region defined by the first frame; and a third frame which is formed to extend upward from the first frame at a predetermined height such that a housing space is provided by the first to third frames.

The printed circuit board may be bonded to the first frame by surface mounding technology (SMT) and may be fixed to the second frame through a screw.

According to another aspect of the invention, an LCD device comprises a liquid crystal panel; and a backlight unit that supplies light to the liquid crystal panel. The backlight unit includes: a printed circuit board having a plurality of LEDs mounted thereon; and a bottom chassis formed with only an outer frame and having the printed circuit board and the optical sheet housed thereon.

The printed circuit board and the bottom chassis may be formed of the same metallic material. For example, the printed circuit board and the bottom chassis may be formed of steel.

The backlight unit may further include an optical sheet provided on the LEDs. The optical sheet may include a diffusion sheet, a condensing sheet provided on the diffusion sheet, and a protective sheet provided on the condensing sheet.

The bottom chassis may include a first frame formed along the edge of the printed circuit board; at least one second frame which divides a region defined by the first frame; and a third frame which is formed to extend upward from the first frame at a predetermined height such that a housing space is provided by the first to third frames.

The printed circuit board may be bonded to the first frame by the SMT and may be fixed to the second frame through a screw.

The LCD device may further include an upper case that presses the edge of the liquid crystal panel so as to fix the liquid crystal panel on the optical sheet.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 1A and 1B are schematic views of an LED module used as a backlight of a conventional LCD device;

FIG. 2 is a schematic cross-sectional view of an LCD device according to the invention;

FIG. 3 is a diagram showing the construction of a light emitting section of FIG. 2;

FIG. 4 is a perspective view of a bottom chassis; and

FIG. 5 is an expanded view of a region A of FIG. 2.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a backlight unit and an LCD device using the same according to the present invention will be described in detail with reference to the accompanying drawings.

FIG. 2 is a schematic cross-sectional view of an LCD device according to the invention.

As shown in FIG. 2, the LCD device 100 include a liquid crystal panel 110 including a thin film transistor (TFT) array substrate 110a, a color filer substrate 110b, and a liquid crystal layer (not shown) formed between the two substrates 110a and 110b; and a backlight unit 150 which supplies light to the liquid crystal panel 110.

Although not shown in FIG. 2, the TFT array substrate 110a include a plurality of gate lines arranged in a first direction, a plurality of data lines crossing the gate lines at right angles, and a plurality of switching elements formed therein. The gates lines and the data lines define a plurality of pixel regions arranged in a matrix shape, and the switching elements serve to switch the respective pixels.

The color filer substrate 110b includes red, green, and blue color filer layers formed in positions corresponding to the pixels and a black matrix formed therein. The black matrix prevents light from leaking between the respective color filer layers, and also prevents color interference of light passing through the pixels.

The TFT array substrate 110a and the color filer substrate 110b have a pixel electrode and a common electrode formed on the inner surfaces thereof, respectively, to apply an electric field to the liquid crystal layer. As a voltage applied between the common electrode and the pixel electrode is controlled, the arrangement state of liquid crystal molecules of the liquid crystal layer is changed so as to individually adjust light transmission rates of the pixels.

The backlight unit 150 includes a light emitting section 130 which supplies light to the liquid crystal panel 110 and an optical sheet 140 which is provided between the liquid crystal panel 110 and the light emitting section 130 so as to enhance light efficiency.

The optical sheet 140 includes a diffusion plate 141, a condensing sheet 143, and a protective sheet 145. The condensing sheet 143 and the protective sheet 145 are provided on the diffusion plate 141.

The diffusion plate 141 diffuses light incident from the light emitting section 130 such that spots caused by partial concentration of light are prevented from occurring.

The condensing sheet 143 is composed of first and second prism sheets. The first prism sheet condenses light, which propagates toward the second prism sheet, in the front and back direction. The second prism sheet condenses light, which propagates toward the protective sheet 145, in the left and right direction. As a result, the light propagating from the diffusion plate 141 to the protective sheet 145 is set up so as to vertically propagate.

Accordingly, the light passing through the condensing sheet 143 vertically propagates so as to be uniformly distributed on the entire surface of the protective sheet 145, thereby enhancing brightness.

The light emitting section 130 is composed of an LED module which includes a light source for generating light and a circuit board for delivering a signal to the light source.

FIG. 3 is a diagram showing the construction of the light emitting section 130.

As shown in FIG. 3, the light emitting section 130 includes a plurality of LEDs 131 and a printed circuit board 135 having the LEDs 131 mounted thereon and circuit patterns printed thereon, the circuit patterns supplying signals to the LEDs 131.

Each of the LEDs 131 may be composed of a plurality of LED lamps, which generate R (red), G (green), and B (blue) lights as one unit group, or a plurality of LED lamps which generate white light as one unit group.

When the LED 131 is composed of a plurality of LED lamps which generate R (red), G (green), and B (blue) lights as one unit group, a light mixing lens may be provided on the LED so as to diffuse the R, G, and B lights such that the R, G, and B lights can be uniformly mixed.

The printed circuit board 135 is formed of steel or metal and may additionally have a reflecting plate 133 provided on the surface thereof, the reflecting plate 133 reflecting light, which is diffused to the lower portion from the LED 131, to the upper portion. Preferably, the reflecting plate 133 is formed of aluminum (Al) with an excellent reflection characteristic.

In the present invention, since the printed circuit board 135 is formed of metal, the printed circuit board 135 may have a reflecting function. In this case, the reflecting plate 133 may be omitted. However, when the reflecting plate 133 is separately provided, light diffused to the lower portion can be more effectively reflected to the upper portion.

Referring to FIG. 2, the backlight unit 150 of the LCD device according to the invention will be described. The light emitting section (the LEDs and the printed circuit board) 130, the optical sheet 140, and the liquid crystal panel 110 are sequentially housed on a bottom chassis 120. Further, the liquid crystal panel 110 is fixed on the optical sheet 140 by a top chassis 150 which presses the edge of the liquid crystal panel 110.

The bottom chassis 120 is formed with only an outer frame and is composed of the same metal as the printed circuit board 135.

FIG. 4 is a perspective view of the bottom chassis 120. As shown in FIG. 4, the bottom chassis 120 includes a first frame 121 formed along the edge of the printed circuit board 135, a second frame 123 which divides a region defined by the first frame 121, and a third frame 125 which is formed to extend upward from the first frame 121 at a predetermined height such that a housing space 127 is provided therein.

The second frame 123 may divide the region defined by the first frame 121 into two or more regions. In FIG. 4, it has been exemplified that the second frame 123 passes through the central portion of the region defined by the first frame 121 so as to divide the region into two regions. However, one or more second frames 123 may be formed.

As described above, the bottom chassis 120 composed of the first to third frames has an opened bottom surface.

Therefore, portions of the rear surface (where the LEDs are not mounted) of the printed circuit board 135 housed on the first and second frames 121 and 123 of the bottom chassis 120 is exposed to the outside through the opened regions (the divided regions).

The printed circuit board 135 may be bonded and fixed to the bottom chassis 120 by SMT (Surface Mount Technology) or a mechanical means.

That is, the region of the printed circuit board 135, which comes in contact with the surface of the first frame 121, may be bonded to the bottom chassis 120 through the SMT, and the region of the printed circuit board 135, which comes in contact with the surface of the second frame 123, may be more stably fixed on the bottom chassis 120 through a mechanical connection such as a screw or the like.

FIG. 5 is an expanded view of a region A of FIG. 2, where the printed circuit board 135 is housed on the surface of the second frame 123. As shown in FIG. 5, a coupling means 129 such as a screw or the like is coupled to a coupling hole 137 passing through the printed circuit board 135 and the second frame 123 such that the printed circuit board 135 can be coupled to the second frame 123. If necessary, a coupling screw with no head may be used, or the head of coupling screw may be removed after the coupling. Then, an undesired projection can be prevented from being formed on the bottom surface of the second frame 123 where the printed circuit board 135 is not housed. In this case, one or more screws may be used.

Since the printed circuit board 135 housed on the bottom chassis 120 formed with only outer frame is formed of metal, the printed circuit board 135 receives heat from the LEDs 131 and then radiates the heat to the outside, thereby preventing an increase in internal temperature.

As the LEDs 131 emit light, heat is generated inside the LEDs 131 and is then absorbed by the reflecting plate 133 so as to be delivered to the printed circuit board 135. When no reflecting plate is provided, the heat is delivered to the printed circuit board 135 as it is.

The heat delivered to the printed circuit board 135 is transmitted to the bottom chassis 120 so as to be radiated to the outside or is radiated to the outside without being transmitted to the bottom chassis 120. Since the bottom chassis 120 is formed with only an outer frame, a contact area between the printed circuit board 135 and the bottom chassis 120 is so small that most of the heat is radiated to the outside without being transmitted to the bottom chassis 120.

In the present invention, a heat transmission member is removed, and the printed circuit board is formed of the same metal material as the bottom chassis. Therefore, a heat radiation effect is more enhanced than in the conventional LCD device, and a material cost can be reduced.

In the conventional LCD device, since a separate heat transmission member is attached to the lower surface of the printed circuit board, a heat radiation effect is degraded by resistance of the heat transmission member. Further, since the bonding between the heat transmission member and the bottom chassis is not uniformly performed, the heat transmission is not partially performed. Therefore, there is a limit in radiating the heat.

Furthermore, since the heat transmission member is used and the printed circuit board is formed of an expensive insulating material such as ceramic, a material cost increases.

In the present invention, however, the printed circuit board is formed of the same cheap metal material (for example, steel) as the bottom chassis, thereby enhancing a heat transmission effect. As the bottom chassis is formed with only an outer frame such that the printed circuit board is exposed to the outside, the heat radiation effect can be further increased than in the conventional LCD device, even though the heat transmission member is removed.

As the heat transmission member is removed, the resistance of the heat transmission member is removed. Further, since the printed circuit board is exposed to the outside, an air flow is so smooth that the heat radiation to the outside is more effectively carried out. Further, since the bottom chassis is formed with only an outer frame, a contact area with the printed circuit board is so small that contact defects therebetween can be prevented.

As described above, the present invention relates to the backlight unit with an excellent heat radiation effect and the LCD device having the same. In the present invention, the LEDs are used as a light source, and the printed circuit board having the LEDs mounted thereon is formed of a cheap metal material such as steel. Further, the bottom chassis having the printed circuit board mounted thereon is formed with only an outer frame, and the heat transmission member is removed. Therefore, the printed circuit board mounted on the bottom chassis is exposed to the outside.

If the above-described construction of the invention is included, all LCD devices belong to the invention regardless of the mode of the LCD device, for example, a switching mode for driving the liquid crystal panel, the structure of a pixel electrode, and the kind of a structure for mounting the liquid crystal panel, the optical sheet, and the light emitting section.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A backlight unit of a liquid crystal display (LCD) device comprising:
   a printed circuit board;
   a plurality of light emitting diodes (LEDs) mounted on the printed circuit board; and
   a bottom chassis formed with only an outer frame and having the printed circuit board housed thereon.

2. The backlight unit according to claim 1, wherein the printed circuit board and the bottom chassis are formed of the same metallic material.

3. The backlight unit according to claim 2, wherein the printed circuit board and the bottom chassis are formed of steel.

4. The backlight unit according to claim 1 further comprising:
   an optical sheet provided on the LEDs.

5. The backlight unit according to claim 4, wherein the optical sheet includes a diffusion sheet, a condensing sheet provided on the diffusion sheet, and a protective sheet provided on the condensing sheet.

6. The backlight unit according to claim 1, wherein the bottom chassis includes:
   a first frame formed along the edge of the printed circuit board;
   at least one second frame which divides a region defined by the first frame; and
   a third frame which is formed to extend upward from the first frame at a predetermined height such that a housing space is provided by the first to third frames.

7. The backlight unit according to claim 6, wherein the printed circuit board is bonded to the first frame by surface mounding technology (SMT).

8. The backlight unit according to claim 6, wherein the printed circuit board is fixed to the second frame through a screw.

9. An LCD device comprising:
   a liquid crystal panel; and
   a backlight unit that supplies light to the liquid crystal panel,
   wherein the backlight unit includes:
      a printed circuit board having a plurality of LEDs mounted thereon; and
      a bottom chassis formed with only an outer frame and having the printed circuit board housed thereon.

10. The LCD device according to claim 9, wherein the printed circuit board and the bottom chassis are formed of the same metallic material.

11. The LCD device according to claim 10, wherein the printed circuit board and the bottom chassis are formed of steel.

12. The LCD device according to claim 9 further comprising:
   an optical sheet provided on the LEDs.

13. The LCD device according to claim 12, wherein the optical sheet includes a diffusion sheet, a condensing sheet provided on the diffusion sheet, and a protective sheet provided on the condensing sheet.

14. The LCD device according to claim 9, wherein the bottom chassis includes:
   a first frame formed along the edge of the printed circuit board;
   at least one second frame which divides a region defined by the first frame; and
   a third frame which is formed to extend upward from the first frame at a predetermined height such that a housing space is provided by the first to third frames.

15. The LCD device according to claim 14, wherein the printed circuit board is bonded to the first frame by the SMT.

16. The LCD device according to claim 14, wherein the printed circuit board is fixed to the second frame through a screw.

17. The LCD device according to claim 9 further comprising:
   an upper case that presses the edge of the liquid crystal panel so as to fix the liquid crystal panel on the optical sheet.

* * * * *